United States Patent [19]

Fuss

[11] Patent Number: 5,788,078
[45] Date of Patent: Aug. 4, 1998

[54] VACUUM FORMED CUSHIONING DEVICE AND METHOD OF MAKING AND USING THE SAME

[75] Inventor: Gunter G. Fuss, San Mateo, Calif.

[73] Assignee: Free Flow Packaging Corporation, Redwood City, Calif.

[21] Appl. No.: 101,499

[22] Filed: Aug. 2, 1993

[51] Int. Cl.$^6$ ................................................ B65D 85/84
[52] U.S. Cl. ........................ 206/521; 206/524.8; 206/524
[58] Field of Search ............................. 206/523, 524, 206/524.8, 586, 521

[56] References Cited

U.S. PATENT DOCUMENTS

| | | | |
|---|---|---|---|
| D. 255,661 | 7/1980 | Atkins | 206/584 |
| 2,472,754 | 6/1949 | Mead | 18/55 |
| 2,778,173 | 1/1957 | Taunton | 53/22 |
| 3,188,264 | 6/1965 | Holden | 206/584 |
| 3,307,318 | 3/1967 | Bauman | 206/524 |
| 3,389,195 | 6/1968 | Gianakos et al. | 206/523 |
| 3,412,521 | 11/1968 | Bauman | 206/523 |
| 3,503,177 | 3/1970 | Kropscott et al. | 206/524 |
| 3,515,267 | 6/1970 | LaRocca et al. | 206/46 |
| 3,968,620 | 7/1976 | Keltner | 53/24 |
| 4,193,499 | 3/1980 | Lookholder | 206/524 |
| 4,620,633 | 11/1986 | Lookholder | 206/523 |
| 4,640,080 | 2/1987 | Wright | 206/524.8 |
| 5,009,318 | 4/1991 | Lepinoy | 206/524.8 |
| 5,079,787 | 1/1992 | Pollmann | 5/450 |
| 5,129,519 | 7/1992 | David et al. | 206/524.8 |
| 5,151,312 | 9/1992 | Boeri | 206/584 |
| 5,186,990 | 2/1993 | Starcevich | 206/584 |

Primary Examiner—M. D. Patterson
Attorney, Agent, or Firm—Flehr Hohbach Test Albritton & Herbert LLP

[57] ABSTRACT

Cushioning device and method for packaging an article in a container using fill material contained within a sealed flexible enclosure. In one disclosed embodiment, the pressure within the enclosure is first reduced to decrease the internal volume of the enclosure and compress the fill material and thereafter increased to allow the fill material to reexpand into cushioning engagement with the article. In another disclosed embodiment, fill material within a flexible enclosure is molded to form a cushion of predetermined shape with the assistance of vacuum pressure and mechanical force. The fill materials include conventional loose fill packing materials, granules, fibers, particles, and the like, such that a body of the fill material has a resiliency and an ability to spring back to near the original volume after being compressed. Recyclable, biodegradable and/or water soluble fill and/or enclosure materials, including materials which could not otherwise be used as a loose fill material because of possible contamination of the article to be packaged, may also be used.

3 Claims, 5 Drawing Sheets

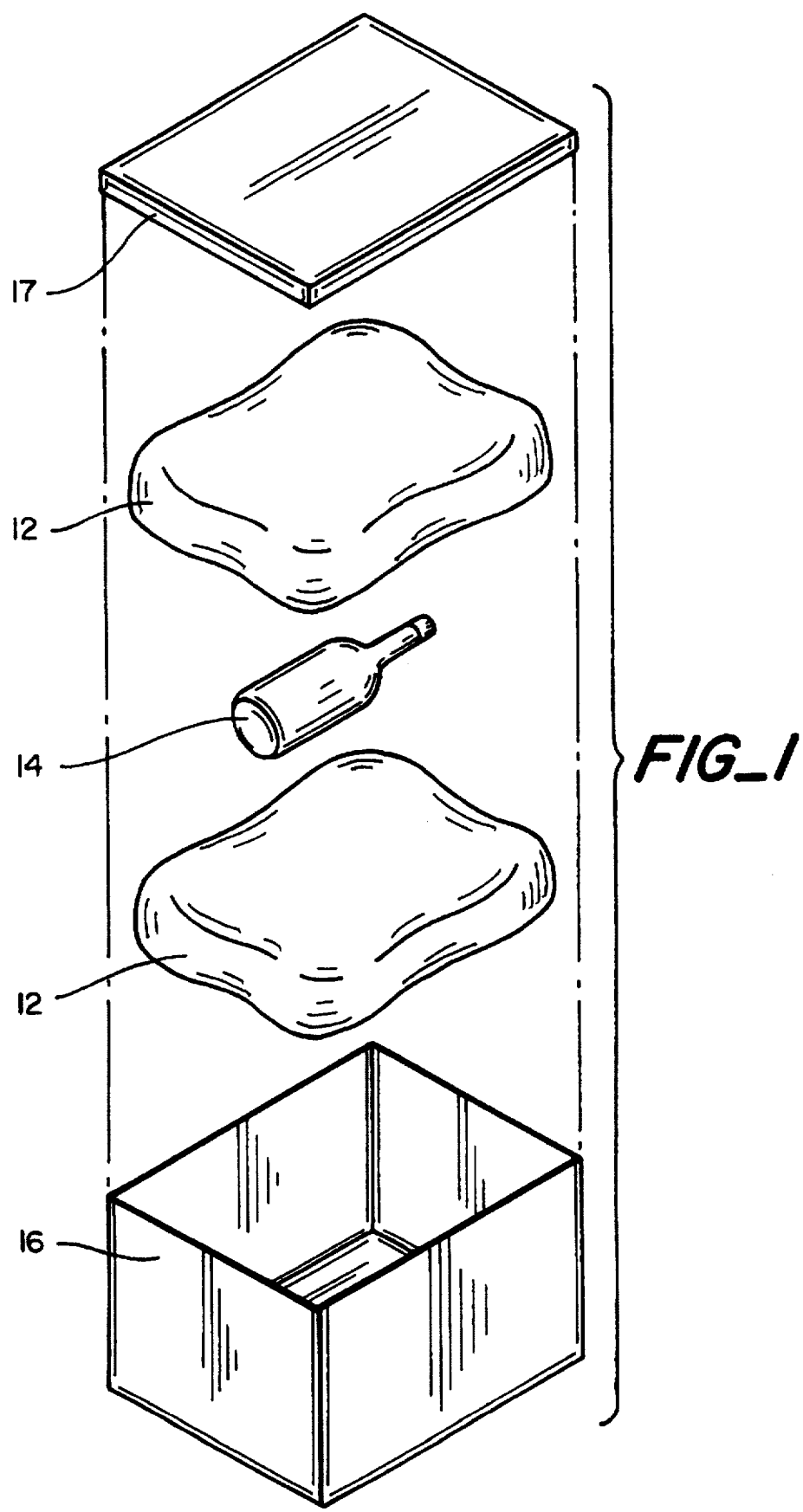

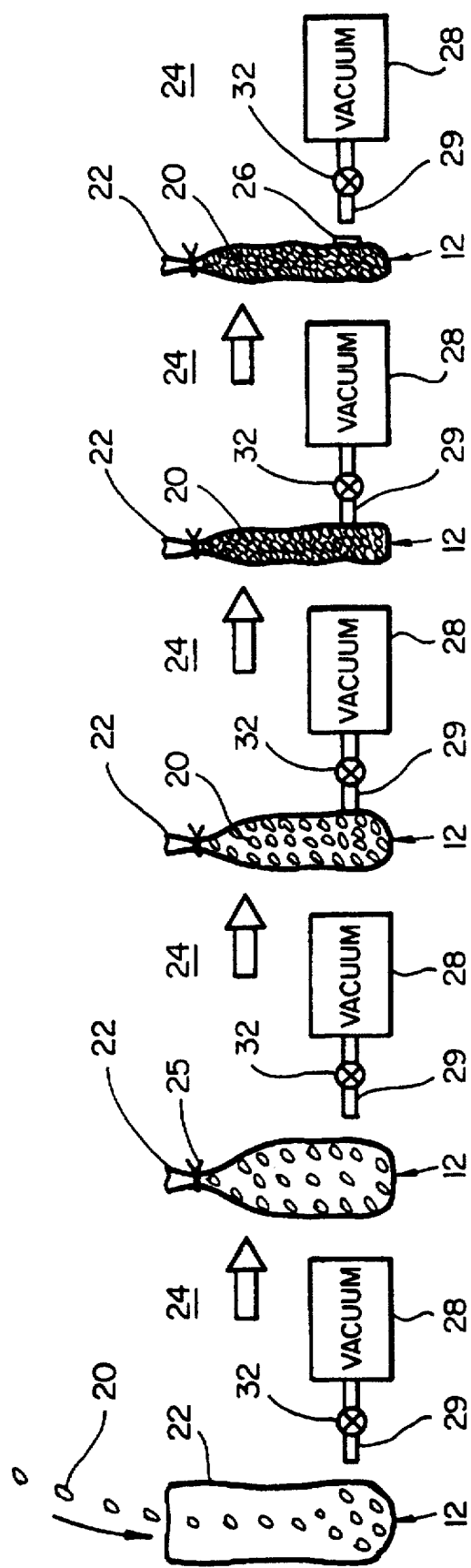
FIG_2

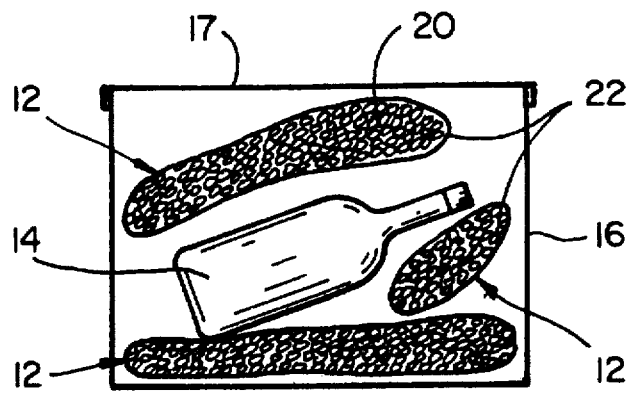
FIG_3
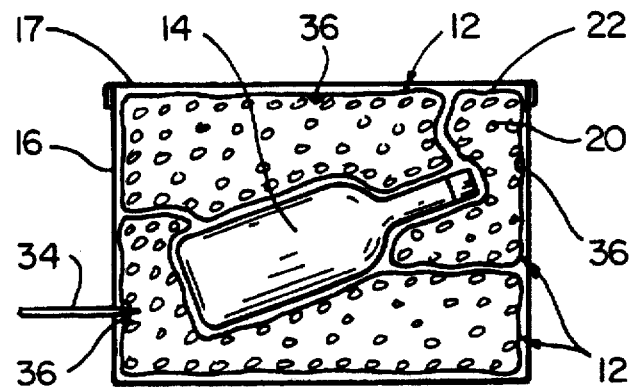
FIG_4
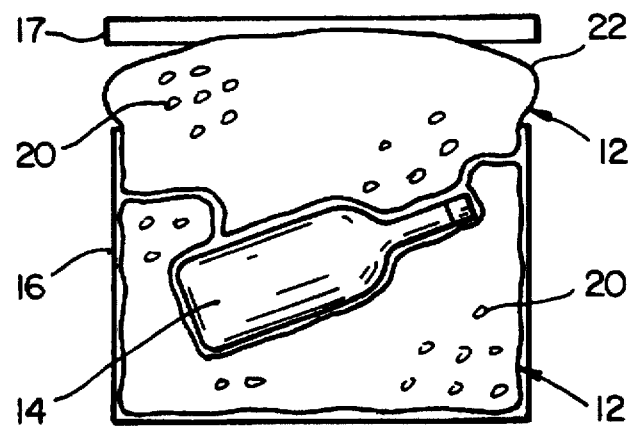
FIG_5

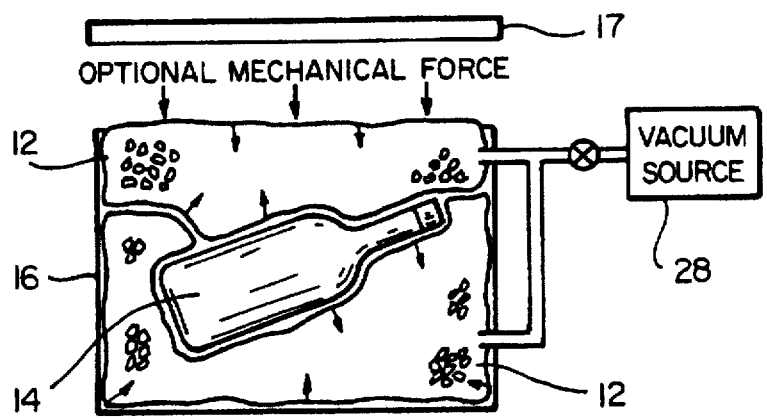
FIG_6
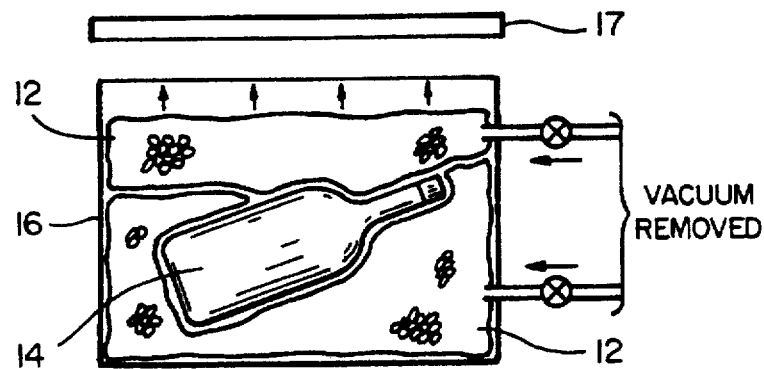
FIG_7
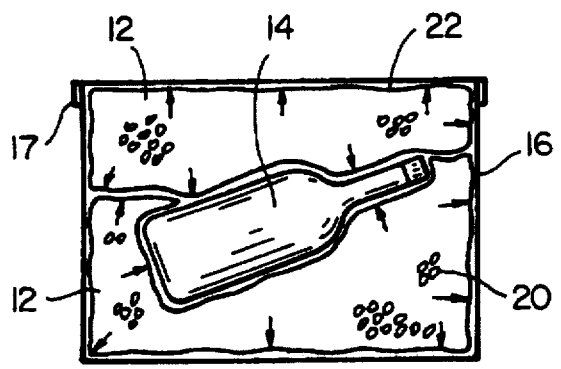
FIG_8
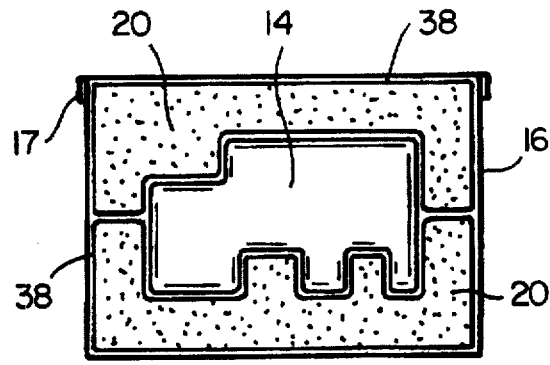
FIG_9

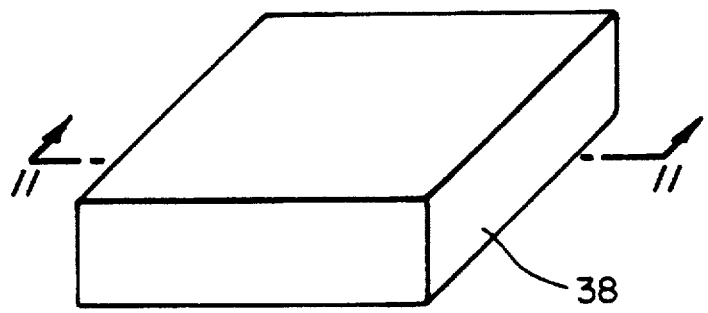
FIG_10
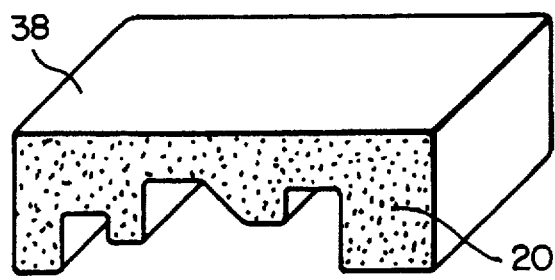
FIG_11
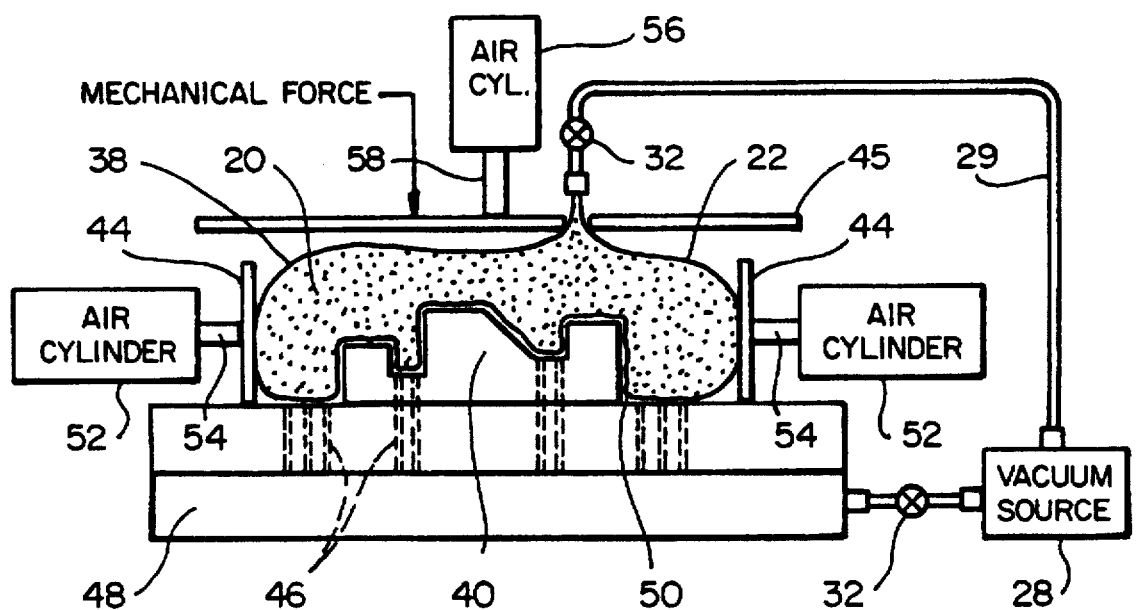
FIG_12

VACUUM FORMED CUSHIONING DEVICE AND METHOD OF MAKING AND USING THE SAME

This invention pertains generally to the protective packaging of articles in containers and, more particularly, to a vacuum formed cushioning device and a method for making and using the same.

Heretofore, there have been some attempts to utilize vacuum formed cushioning materials in the protective packaging of objects in containers. U.S. Pat. No. 5,009,318, for example, suggests the use of granular materials in pouches from which the air is exhausted to form a rigid protective cushion, and U.S. Pat. No. 4,620,633 shows the use of slabs of open cell foam which are compressed about an object and held in a compressed condition in a vacuum sealed sack.

Although not used for packaging or cushioning purposes, large flexible foam objects such as pillows have been reduced in size by vacuum compression for shipment and storage, as discussed, for example, in U.S. Pat. No. 4,620,633.

Vacuum formed cushioning materials have also been used in other areas such as shoes or boots. U.S. Pat. No. 2,472,754, for example, shows the use of a granular material mixed with water within a sack of thin, extensible material to form an impression of a foot, following which the fluid is exhausted by a vacuum pump to solidify the granular material within the sack so that it will retain its shape.

U.S. Pat. No. 3,515,267 shows a packing formed by placing bags of crush resistant granular material, such as expanded plastic beads, around a fragile object, and U.S. Pat. No. 5,079,787 shows a pressure equalizing support structure comprising loose pieces of deformable material with a low friction coating within a flexible enclosure. These patents do not, however, suggest the use of vacuum packaging to compress or form the material about the object.

Vacuum packaging has also been utilized in the packaging of granular or pulverulent food products such as cheese, as discussed, for example, in U.S. Pat. No. 2,778,173.

Many of the packaging methods and devices heretofore utilized to protect articles from damage during storage or shipment have commonly relied on the use of petroleum derived materials, such as synthetic rubber, open and closed cell foams, and the like. These materials are commonly chosen because of their ability to firmly hold and cushion an article from mechanical impact. However, the use of these materials can be ecologically undesirable because of the natural resources and energy consumed for their manufacture, the generation of undesirable byproducts, and the problems associated with disposal of the used packaging materials. While alternate packing materials including nonpetroleum derived packaging materials have been used, they are used less frequently than petroleum based materials.

The absence of suitable packing methods contributes to the less frequent use of these alternate materials.

It is a general object of the invention to provide a new and improved device and method for packing an article in a container.

Another object of the invention is to provide a cushioning device and method of the above character which employ biodegradable or water-soluble materials.

These and other objects are achieved in accordance with the invention by providing a cushioning device which comprises a flexible enclosure and a body of fill material within the enclosure. The enclosure is sealed, and the pressure within the enclosure is reduced to a level below the level outside the enclosure to compress the fill material. The pressure within the enclosure is then increased to reexpand the cushioning device to conform to an article and the container in which it is packaged.

In one embodiment, a molded cushion is made by positioning a body of fill material within a flexible enclosure adjacent to a molding surface, reducing the pressure within the enclosure relative to the pressure outside the enclosure, and applying a mechanical force to press the fill material within the enclosure against the molding surface as the pressure is reduced.

The purpose and advantages of the present invention will be apparent to those skilled in the art from the following detailed description in conjunction with the drawings.

FIG. 1 i an exploded isometric view of one embodiment of a cushioning device used to package an article in a container according to the present invention.

FIG. 2 is in the nature of a flow chart which shows several steps in the fabrication of a cushioning device in accordance one embodiment of the invention.

FIG. 3 is a cross-sectional view, somewhat schematic, of a container with an article in the process of being packaged with several cushioning devices in accordance with the invention.

FIG. 4 is a cross-sectional view, somewhat schematic, of a container with an article after being packaged with several cushioning devices in accordance with the invention.

FIGS. 5, 6, 7,and 8 are cross-sectional views, somewhat schematic, each showing a container with an article at different stages in the process of being packaged with cushioning devices using vacuum assistance in accordance with the invention.

FIG. 9 is a cross-sectional view, somewhat schematic, of a container with an article packaged with two molded cushion devices in accordance with the invention.

FIG. 10 is a perspective view of one embodiment of a molded cushion device according to with the invention.

FIG. 11 is a perspective cross-sectional view of the molded cushion in FIG. 10, showing a molded contour surface.

FIG. 12 is a schematic view, of one embodiment of apparatus for making a molded cushion in accordance with the invention.

In FIG. 1, the invention is illustrated in conjunction with the packaging of an article 14 in a container 16 which has a removable lid or top 17. The article is illustrated as being in the form of a bottle, but it can be anything that needs to be protectively packaged. The container is illustrated as being a cardboard box, but it can be any container which is suitable for packaging or shipping the article. The lid can be secured to the container by any suitable means such as taping or stapling.

The article is protected within the container by a plurality of cushioning devices 12, each of which has a flexible enclosure and a body of compressible fill material within the enclosure. After the fill material is placed in the enclosure, the enclosure is sealed and air and/or other gases or fluids are withdrawn from the enclosure to reduce the pressure within the enclosure to a level below that of the surrounding environment, e.g. below atmospheric pressure. The difference in the air pressures inside and outside the enclosure compresses the fill material until the resilient force of the material counterbalances the compressive force applied by the pressure differential. The interior of the enclosure is thereafter repressurized to reexpand the fill material to conform to contours of the article and the interior walls of the container. The cushioning devices can be reexpanded and used immediately after compression, or they can be stored and/or shipped in the compressed state.

A preferred method of manufacturing cushioning devices 12 is illustrated in FIG. 2. First, a body of volumetrically compressible fill material 20 is placed in a flexible enclosure 22. Then, the enclosure is sealed to prevent the fill material from escaping, and to prevent air 24 from entering the enclosure so that it may be evacuated or depressurized. In other embodiments, the enclosure may be initially closed so that the fill material does not escape and later sealed to prevent entry of gas after evacuation is completed. Enclosure 22 may also be closed and sealed prior to evacuation, then a new, and generally much smaller opening is made in the enclosure through which the air is removed. This small opening is then sealed when evacuation is completed.

Enclosure 22 must be relatively impermeable to gas and should be capable of retaining a depressurized or evacuated state for the length of time it will be stored after fabrication before use. A relatively high degree of gas impermeability is needed for a long storage period, while a lower relative degree of gas impermeability is needed when the storage period will be short. In situations where the period of storage will be short, even a porus paper, paper based material, woven fabric, or similar material may be used. For certain embodiments described hereinafter, the storage period is virtually nonexistent, and enclosure 22 need not be impermeable to gas; it need only restrict the rapid flow of gas and support the maintenance of a pressure differential while vacuum is applied.

The enclosure may be sealed using tie 25 to tie the opening shut as illustrated; however, any suitable means for sealing the enclosure may be used after providing the fill material and evacuating the air. For example, a portion of the enclosure may be fused to another portion along a seam line, adhesive tape may be used, or a separate seal may be provided. The type of seal will generally depend on the enclosure material, and the degree of gas impermeability required. Enclosure 22 may alternately be formed around a body of fill material, such as from one or more sheets of material, and then sealed, rather than by adding the fill material to a preformed enclosure.

Total evacuation of gas 24 from the enclosure is not required, the evacuation need only be sufficient to achieve the desired degree of compression of the fill material. The pressure differential causes the flexible material of enclosure 22 to exert a mechanical compressive force on fill material 20 which is transmitted substantially throughout the body of the fill material by the surrounding enclosure directly, and indirectly via the individual fill material elements.

Enclosure 22 is evacuated by means of a vacuum source 28, such as a vacuum pump or an exhaust fan connected to the enclosure by a hollow tube 29. The magnitude of the pressure differential between the inside and outside of the enclosure is selected so that the desired compression of the fill material is achieved. The required pressure depends generally upon the characteristics of the fill material, and may depend to a lesser extent on the characteristics of the enclosure. If desired, a vacuum control valve 32 may be used in conjunction with vacuum source 28 to provide a particular vacuum setting cut-off level for each type of fill material and enclosure.

Various types of suitable vacuum sources 28 are known in the mechanical arts. For example, oil-less diaphragm and piston type air compressor/vacuum pumps may be used, such as Thomas Model 210CA20. Vacuum motor/blower type vacuum sources are also suitable, such as AMETEK Model 116025-13.

Generally, a vacuum pressure of between about 50 inches of $H_2O$ and about 100 inches of $H_2O$ (between about 3 inches of Hg and about 8 inches of Hg) is suitable. However, higher vacuum levels may be suitable for some combinations of highly resilient fill materials and stiff enclosure materials.

Enclosure 22 is made of a flexible material that has the ability to conform to the surface of article 14 and container 16 so that the article is securely held within the container after reexpansion (as described hereinafter). However, the material for the enclosure need not be so flexible that it conforms to all surface features of the article or to all contours of each element of the fill material.

Enclosure 22 is sufficiently flexible and non-rigid so as to impart an appropriate amount of mechanical compressive force on the fill material elements adjacent to the surface of the enclosure, and is able to volumetrically contract when a vacuum pressure from vacuum source 28 is applied and internal gas 24 is evacuated. For example, a non-rigid sheet-like material is a suitable enclosure material.

While a flexible material is needed for the enclosure, the material should not stretch or elongate appreciably. Generally, stretch or elongation of the enclosure material should not exceed about 20%, and preferably the stretch or elongation should not exceed about 5%, but greater or lesser amounts of stretch may be tolerated in a given packaging application. A material with suitable stiffness, elasticity, and stretch characteristics are chosen in conjunction with the characteristics of fill material 20, the magnitude of the applied vacuum, and the desired packaging characteristics of cushioning device 12.

Suitable materials for the enclosure include but are not limited to metallic foils; plastic, mylar or other films and membranes; coated woven materials; and films and membranes made of biodegradable and/or water soluble materials. The enclosure may also be fabricated with composite materials, including multi-ply films, or by including a strengthening material (such as cotton twine mesh) in cooperative association with the foil, film or membrane.

Fill material 20 may be of any of a variety of types, and may be either a single material, or alternately a composite or aggregation of different material types and/or sizes and shapes so that cushioning properties derive from the interaction of the different material elements.

The fill material should be compressible under the force produced by the pressure differential, and should also have sufficient spring-back or resiliency to permit reexpansion upon removal of the pressure differential. The invention is not limited, however to materials which are resilient in the conventional sense. As used here, a resilient material is a material which is non-rigid and has some spring-back quality. The spring-back characteristic may be a property of the material cell structure, as in polyurethane foam, polystyrene foam, and the like, as in conventional resilient materials. It can also come from the configuration and/or interaction of the individual elements, as in crumpled paper, wood shavings, metal springs, and the like.

The individual pieces of the fill material elements may be of a variety of shapes including, but not limited to, beads, balls, chips, shavings, nodules, granules, particulates, fibers, twigs, straw, crumpled or folded materials including paper, and other shapes that in conjunction with their respective material properties provide the required compression and reexpansion or spring-back characteristics. Bulk material such as open cell foam may also be used.

Generally the body of fill material 20 is compressed by a factor of from about 1.2:1 to about 5:1. More usually the volumetric compression is between about 1.2:1 and about 2:1. Preferably, the fill material will be capable of re-expanding to its original volume, but generally the re-expanded volume may be somewhat less than the original uncompressed volume. The fill material should be capable of re-expanding after compression to between about 30% and about 100% of its original volume. When the cushioning device is repressurized in the container, the reexpansion of the fill material is restrained by the article and the sides of the container. The amount of reexpansion need not be equivalent to the amount of the prior compression. The difference in volume may be due to factors such as more complete nesting of the fill material elements after compression, some crushing of the fill material, and the like. The volumetric relationship depends on the characteristics of the cushioning material and the compressive force applied.

The resilience of cushioning device 12 can be varied by the amount of fill material placed in the enclosure, and by the compressive force applied. Stiff resilience is provided for heavy articles 14 by providing a relatively large amount of fill material, enough so that upon applying vacuum, the enclosure is shrunk to just below container size thereby providing a tight or high density fill. Alternately, maximum cushioning is provided for light articles by providing an relatively small amount of fill material so that upon applying vacuum, the enclosure may be reduced in volume considerably below the size of the container so that the ensuing expansion swells the enclosure to just barely fill the container, thereby providing a loose fill.

The present invention can be used with recyclable, biodegradable, and/or water-soluble materials for either of fill material 20 or enclosure 22. However, the invention is not limited to recyclable, biodegradable, and/or water-soluble materials, and any materials having the aforedescribed properties may be used.

Suitable recyclable materials for enclosure 22 include but are not limited to Saran, ethylene vinyl acetate (EVA), polyethylene film, paper, and the like. Suitable water-soluble materials for enclosure 22 include but are not limited to polyvinyl alcohol (PVOH) based materials, and hydrocarbon based alloys, such as the Enviroplastic-H based on polyoxyethylene, for example. Suitable biodegradable materials for the enclosure include but are not limited to water-soluble polyvinyl alcohol (PVOH) based films; polycaprolactone-alphatic ester based materials; polyhydroxybutyrate-valerate (PHBV) copolymers; polyoxyethylene based materials; polyester based compostable material; starch based biopolymer materials; and other starch based materials such as those that include a catalyst to enhance photo and oxidative degradation. Other suitable materials are known in the art.

Suitable materials for fill material 20 include but are not limited to, extruded polystyrene (EPS) beads, crumpled paper, starch based materials, water soluble materials, and biodegradable materials. Suitable biodegradable materials for the fill material include but are not limited to starch graft copolymer materials, starch biopolymer materials, and naturally occurring biodegradable materials such as wood chips and shavings, plant materials including fibers, twigs, and seeds, popped popcorn, and the like.

Cushioning device 12 may be used either immediately after fabrication or it may be stored and shipped in a compressed condition and used for packaging article 14 at a later time.

In one embodiment of a method for using a compressed cushioning device 12 to package an article, one or more cushioning devices are placed in the container with the article prior to pressure equalization, as illustrated in FIG. 3.

The size and/or number of cushioning devices is selected in accordance with the internal volume of the container, the volume of the article or articles, the density of the final packaging desired, and both the compressed and reexpanded volumes of the cushioning device. Different sized cushioning devices may be used within a single container, and each may optionally contain different fill materials and/or have different enclosure materials to achieve the desired packaging properties.

Next, each cushioning device 12 is caused to expand by allowing gas to enter the enclosure so that the internal pressure within the enclosure substantially equalizes with the external pressure (generally atmospheric air pressure). When this occurs, the mechanical compressive force exerted via the enclosure on the body of fill material is removed and the fill material and consequently the cushioning device reexpands. Preferably, a pointed instrument, such as a lance or other pointed object 34, is used to open a hole or aperture 36 in the container and in the enclosure contained therein, from outside closed the container. The lance is removed after the aperture is made. Alternatively, aperture 36 may be made in the wall of the enclosure just prior to closing the container. This aperture may be made using lance 34, or another means for allowing equalization of the internal and external pressures may be used. For example, a pealable adhesive seal (not shown) may be provided on the enclosure to cover a precut aperture. This pealable seal is removed just prior to closing the container. In either alternative, the size of the aperture determines the period of time required for pressure equalization. When the aperture is made prior to closing the container, it is preferably made small enough to permit the container to be closed before the fill material expands beyond the level of container top 17, thereby facilitating placement of top 17 without requiring undue closing force. In FIG. 4, the cushioning devices in their expanded condition, after the pressure has been equalized, are shown securely holding the article within the container.

FIGS. 5–8 illustrate an embodiment in which cushioning devices 12 are compressed inside container 16 at the time article 14 is packaged. This embodiment eliminates the need for storing the fabricated compressed cushioning device, and permits the use of enclosure materials that are somewhat more permeable to gas 24 than those that are generally useful with a precompressed cushioning device.

In accordance with this embodiment, one or more uncompressed cushioning devices is placed in the container with the article, as shown in FIG. 5. In this example, two cushioning devices 12 are used, one below the article and the other above it.

The amount of fill material is selected so that each cushioning device has an uncompressed volume (when exposed to atmospheric pressure) such that the combined volumes of the article(s) and cushioning devices somewhat overfill the container. Overfilling at this stage is preferred to insure some compression of the fill material around the article when the container is later closed. The amount of fill material is also selected so that the cushioning device has a compressed volume such that the combined volumes of the article(s) and the cushioning devices somewhat underfill the container. Under-filling in the compressed state facilitates closing of the container.

As shown in FIG. 6, after the cushioning devices are placed inside the container with the article, the cushioning devices are depressurized by evacuating enclosures 22 with a vacuum source 28. The resulting pressure differential causes the enclosure to collapse and exert a compressive force on the fill material, as described previously. Vacuum should be sustained until the fill material contracts to the point where it occupies a volume smaller than the volume of the container, including sufficient extra space for the container to be closed before the enclosures and fill material re-expand. In some applications, it may be desirable to apply a mechanical force to the cushioning devices as they are being evacuated to assist in the removal of gas 24 and to distribute the fill material within the container.

Container 16 is then closed, as shown in FIGS. 7–8, and the container top 17 is secured to the container by suitable means such as packaging tape or staples. The fill material is reexpanded to press the conformable exterior wall of enclosure 22 into embracing conformity with article 14 and the inner surface of container 16.

The container may be closed either prior to or concurrently with the reexpansion of the fill material, and means is provided for initiating the reexpansion from outside the container. For example, vacuum source 28 may be connected to enclosure 22 from outside of container 16 through a small hole in the container and applied continuously while the container is being closed; then the vacuum source may be disconnected so that the internal and external pressures are able to equalize. In other applications, an internal seal may be removed from the evacuated enclosure to allow air to enter using an externally accessible pull tab coupled to the seal.

The same types of fill material 20 previously described for a precompressed cushioning device 12 may be used in this embodiment. Furthermore, enclosure 22 has the same properties as previously described except that there is no need to retain an evacuated state for a period of time beyond the time required to actually package the article. Therefore, enclosure 22 can be relatively more permeable to gas 24 when the cushioning device is evacuated and pressure equalized while in the container, than when the cushioning device is precompressed and stored prior to use. Furthermore, the sealing of the enclosure during evacuation need not be complete when the vacuum source evacuates a sufficient volume of air, because the continuous application of vacuum maintains the evacuated and compressed state.

In the embodiment of FIG. 9, a pair of molded cushions 38 are used to package article 14 in container 16. These molded cushions 38 are similar to cushions 12 except they are molded to conform to some of the contours of the article and the container prior to use. The molded contours of the cushions allow the cushions to be interposed between the article and the container so that the article is securely held within the container. The molded cushions need not conform to all of the article or container contours to be used effectively.

One example of apparatus for making the molded cushions 38 is shown in FIG. 12. This apparatus includes a molding form 40, side plates 44, and a top plate 45. The molding form has the same contour as at least a portion of the article to be packaged, and plates 44, 45 are movable to exert a mechanical pressure on the cushioning material. A vacuum source 28 is provided for reducing the pressure within enclosure 22 at the same time the mechanical pressure is applied.

The simultaneous application of mechanical molding force and depressurization force from vacuum source 28 causes the enclosure to volumetrically shrink, and fill material 20 to compress and assume a shape conforming to molding form 40. The enclosure is then sealed to prevent the entry of air that would equalize the pressure and cause the cushion to reexpand. Once the enclosure is sealed, the mechanical force and the depressurization force are removed, and molded cushion 38 is removed from the molding apparatus. In another application, where the fill material is of a type that does not reexpand after compression, the sealing of enclosure 22 is not required prior to removal of the mechanical and depressurization forces.

A plurality of vacuum passageways 46 open through the surface of molding form 40 and communicate with vacuum source 28, via a vacuum chamber 48. The vacuum applied through these passageways draws the enclosure material into corners 50 of molding form 40 and thereby facilitate migration of the fill material into the corners. This permits more intricate shapes to be molded.

Side plates 44 are connected to air cylinders 52 by plungers 54. Although only two sets of side plates and cylinders are shown, similar plates and cylinders are also provided for molding the other two side surfaces of cushion 38. Plates 44 are generally planar to conform to walls of container 16, but can be any suitable shape. Side plates 44 serve as a movable form for the side surfaces of the molded cushion, and air cylinders 52 provide means for moving these plates laterally to compress fill material 20 to the desired shape. Top plate 45 is connected to air cylinders 56 by plunger 58. Top plate 45 is generally planar to conform to the top (or bottom) of container 16, but can be any suitable shape. The top plate serves as a movable form for the molded cushion in the same fashion as side plates 44. Air cylinder 56 provide means for moving the plate vertically to compress the fill material to the desired shape. The cylinders may be connected to a source of compressed air (not shown) or may alternatively be connected to operate by vacuum from vacuum source 28 to provides the motive force. Other means for compressing fill material into molding form 40 may be used, such as manual pressure, or by pressing the fill material from only some of the surfaces and fixing other surfaces.

Molded cushions 38 may be designed to reexpand in the manner of cushions 12. However, cushions 38 are generally molded to a static size and shape that conforms to the article and the container. In such a non-reexpanding cushion, fill material 20 may compress only slightly, and need not reexpand after being compressed. The amount of compression is selected to achieve the desired density and cushioning characteristics. Some reexpansion may be anticipated for certain fill materials, however, if reexpansion to a larger size is not desired, any such reexpansion characteristics may be compensated for by molding a smaller size when making the cushion.

In one embodiment, the molded shape of cushion 38 is retained by maintaining the pressure differential between the inside and outside of the enclosure. In this embodiment, the inside of the enclosure remains sealed. In another embodiment, the molded shape is retained by restricting the mobility of the fill material so that it is substantially prevented from migrating. Restraint of migration prevents appreciable reexpansion. This mobility restraint may derive from the use of fill material elements that somewhat or substantially interlock during the application of mechanical and depressurization forces, and/or by the use of an enclosure material that somewhat retains the conformation of molding form 40 once molded. A fill material of a type that adheres to itself upon being compressed against other fill material elements may also be used. In a third embodiment, the fill material is a material capable of absorbing energy to protect the article, but does not spring back when compressed.

Molded cushions 38 permit the use of various fill materials in additional to conventional fill materials including the extruded polystyrene (EPS) that is conventionally used for molded shapes. The size and shape of individual fill elements, will generally affect the intricacy of the molded shape. For example, small particles will generally permit more intricate molding than will large particles. The fill material does not have to all be a single type, and combinations of different materials may be used in a single molded cushion to achieve desired overall cushioning characteristics, molded shape intricacies (voids and protuberances), and cost efficiencies. The different materials can, for example, be arranged in layers.

The invention has a number of important features and advantages. It permits the use of conventional materials, and furthermore permits the use of certain biodegradable materials that would not be acceptable as a conventional loose fill. Providing fill material within an enclosure eliminates or substantially reduces problems associated with dusting, chipping, attack by insects or rodents, decomposition, wilting of plant materials, release of odors, and the like, that could contaminate or adversely affect the article.

While a particular embodiment of the invention has been described in detail, it will be understood that the invention may be implemented through alternative embodiments. Thus, the scope of the present invention is not intended to be limited to the embodiments described above, but is to be defined by the appended claims their equivalents and their equivalent language.

What is claimed is:

1. In a method of packaging an article in a container, the steps of:

placing a multitude of particles of biodegradable fill material which In the aggregate form a compressible body in a flexible enclosure of biodegradable material which has an external surface for engagement with the article and a wall which serves as a protective barrier to keep the fill material out of direct contact with the article;

molding the body of fill material outside the container to a shape corresponding to the contour of the article and the interior of the container; and placing the molded body of fill material and the article into the container with the external surface of the enclosure engaging the article and the wall of the enclosure isolating the article from direct contact with the fill material.

2. A method as in claim 1, further comprising the steps of closing the container and increasing the pressure within the enclosure so that the fill material can reexpand.

3. A method as in claim 1, wherein the body of fill material is compressed outside the container to a volume on the order of 20 to 80 percent of the uncompressed volume of the body.

* * * * *